US007833442B2

(12) United States Patent
Chen et al.

(10) Patent No.: US 7,833,442 B2
(45) Date of Patent: Nov. 16, 2010

(54) METHOD FOR COATING AN OPHTHALMIC LENS WITHIN AN INJECTION MOLDING MACHINE

(75) Inventors: Xu Chen, St. Petersburg, FL (US); Matthew Lockwood, Bradenton, FL (US); Hsinjin Yang, Palm Harbor, FL (US)

(73) Assignee: Essilor International (Compagnie Generale d'Optique) (FR)

( * ) Notice: Subject to any disclaimer, the term of this patent is extended or adjusted under 35 U.S.C. 154(b) by 1296 days.

(21) Appl. No.: 11/313,590

(22) Filed: Dec. 21, 2005

(65) Prior Publication Data

US 2007/0138665 A1 Jun. 21, 2007

(51) Int. Cl.
*B29D 11/00* (2006.01)
*G02C 7/02* (2006.01)
(52) U.S. Cl. .................... 264/1.7; 264/2.2; 264/2.7; 264/255; 425/808; 351/159; 351/177
(58) Field of Classification Search ............... 264/1.32, 264/1.7, 255, 40.5, 328.7, 328.8, 328.1, 2.2, 264/2.7; 425/135, 556, 565, 437; 524/430; 351/177, 163; 427/561, 162; 525/276
See application file for complete search history.

(56) References Cited

U.S. PATENT DOCUMENTS

| 4,386,042 A * | 5/1983 | Tatebayashi ................ 264/135 |
| 5,376,317 A | 12/1994 | Maus et al. |
| 5,523,030 A * | 6/1996 | Kingsbury .................. 264/1.7 |
| 5,658,672 A * | 8/1997 | Lenke et al. ............. 428/423.1 |
| 5,777,053 A | 7/1998 | McBain et al. |
| 5,943,957 A | 8/1999 | Mason |
| 6,180,043 B1 | 1/2001 | Yonemochi et al. |
| 6,270,219 B1 * | 8/2001 | Saito .......................... 351/169 |
| 6,416,690 B1 * | 7/2002 | Soane et al. ................ 264/1.7 |
| 6,676,877 B2 | 1/2004 | Thompson |

(Continued)

FOREIGN PATENT DOCUMENTS

EP    1 207 031    5/2002

(Continued)

OTHER PUBLICATIONS

Berins, Michael L.., Plastics Engineering Handbook of the Society of the Plastics Industry, Inc., 5th Edition, 1991, Van Nostrand Reinhold Company Inc., pp. 144 and 253.*

(Continued)

*Primary Examiner*—Richard Crispino
*Assistant Examiner*—William P Bell
(74) *Attorney, Agent, or Firm*—Keusey & Associates, P.C.

(57) ABSTRACT

A method for in-mold coating of an injection molded thermoplastic lens that resides in an injection molding machine oriented to a horizontal parting line. An optical lens is initially formed by injecting molten thermoplastic resin into an edge-gated lens-forming cavity held closed under a primary clamp force. The mold is opened at a time when the lens is rigid enough to retain its shape. An unpressurized full metered charge of coating is applied onto the center of the lens. The coating is co-molded by ramping up the clamp force from zero to a secondary clamp force less than the primary clamp force to compress the coating into a uniformly thick, fringe-free layer.

29 Claims, 4 Drawing Sheets

U.S. PATENT DOCUMENTS

| | | | |
|---|---|---|---|
| 6,749,779 B2 * | 6/2004 | Soane et al. ................. | 264/1.1 |
| 2003/0077425 A1 | 4/2003 | McBain et al. | |
| 2003/0082344 A1 | 5/2003 | Straus et al. | |
| 2003/0099809 A1 | 5/2003 | Straus et al. | |
| 2003/0152693 A1 | 8/2003 | Su et al. | |
| 2004/0125335 A1 | 7/2004 | Vu | |

FOREIGN PATENT DOCUMENTS

| | | | |
|---|---|---|---|
| GB | 582248 | | 11/1946 |
| JP | 05318527 A | * | 12/1993 |
| WO | WO 03/003118 | | 4/2003 |
| WO | WO 03/031138 | | 4/2003 |
| WO | WO 03/035354 | | 5/2003 |
| WO | WO 2004/048068 | | 6/2004 |
| WO | WO 2004/048076 | | 6/2004 |

OTHER PUBLICATIONS

Phernell Walker, The Truth about Base Curves, The American Board of Opticianry Master in Ophthalmic Optics Program, 15 pages.

International Search Report & Written Opinion from PCT/IB2006/004146, 10 pages, Sep. 4, 2007.

* cited by examiner

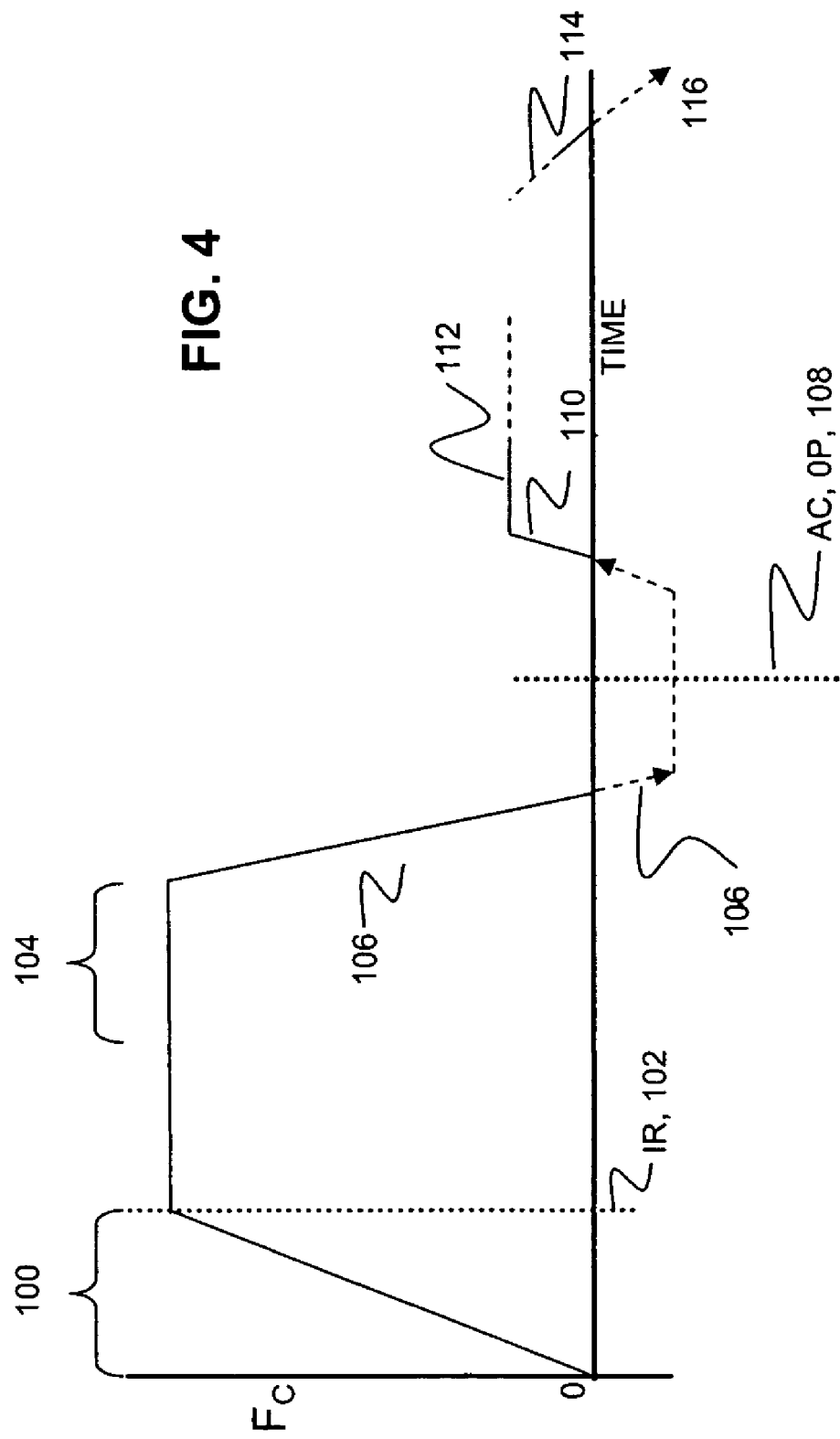

METHOD FOR COATING AN OPHTHALMIC LENS WITHIN AN INJECTION MOLDING MACHINE

BACKGROUND OF THE INVENTION

1. Field of the Invention

The invention relates to manufacturing in-situ coated thermoplastic lens, by applying a coating solution to the surface of ophthalmic lens while it is still in the mold.

2. The Prior Art

In-situ coating via a direct injection process, so called in-mold coating was originally developed to improve the surface appearance of fiber reinforced thermosetting composites such as SMC and BMC parts. In relatively more recent years it's been applied to injection molded thermoplastic parts.

For the regular injection molding process, the thermoplastic piece is ejected out of the mold once it is rigid enough to resist the deformation caused by ejection. In-situ coating injection integrates with injection molding by injecting thermoset coating liquid on the exterior surface of the thermoplastic piece when the thermoplastic piece is solidified to the degree that it won't be damaged by the coating injection. More coating is injected after the desired surface coverage is obtained to achieve certain coating thickness.

This method of in-mold coating has an advantage, in that the coating is able to cure at the same time as the part is cooling. Since access to the part is limited, most of these systems introduce the coating at the top of the mold cavity with the coating injector being located near the parting line. Generally, the molding machine configurations having a vertical parting line, with the movable mold half being reciprocated in a horizontal direction. An example of such machine configuration can be readily seen in U.S. Pat. No. 6,180,043. This patent is concerned with high gloss, opaque coatings, containing as much as 30% and up to 45% titanium dioxide and other pigments. Clearly, for such coatings in which one sees only a highly reflective outer surface, there is no requirement for uniformity or transparency, as with an optical coating.

In patents and publications such as: U.S. Pat. No. 6,676, 877, WO 2004/048068, US 2003/0077425, 2003/0082344 (corresponding to International Publication WO 03/035354) and US 2003/0099809, a method of in-mold coating without opening the mold is disclosed. Several specially designed features of the mold such as coating containment shroud were described. These features can prevent coating solution from contaminating the liquid resin in the nozzle and the barrel of the injection molding machine or leaking from the parting line. However, since coating is injected into a no-gap cavity filled with thermoplastic, a high coating injection pressure is required. In addition, there is no requirement for coating thickness uniformity or transparency, as with an optical coating.

U.S. Pat. No. 5,943,957 discloses a method for pad printing inked images onto injection-molded pieces while they are still in the mold. The patented method relates to conventional ink that air dries, and does not involve an optical grade coating that will be spread over the lens by re-clamping the mold inserts and allowing the coating to cure via the retained heat in the mold block. Published U.S. Patent Application 2003/0152693 discloses pad printing of lenses, but applies a UV or microwave curable coating on cast lenses which are totally divorced from any contact with an injection molding machine.

The present invention provides a method to apply coating on the surface of ophthalmic lens while it is still in the mold. Coating is thermally cured by the heat from the mold and the residual heat from the thermoplastic lens.

SUMMARY OF THE INVENTION

It is an object of the present invention to provide an in-mold coating system that results in a coating of optical quality.

It is a further object of the present invention to apply the coating solution in an unpressurized state to the lens while the mold is open.

It is another object of the invention to co-mold the coating into a uniformly thick, fringe-free layer.

This application discloses a simple method of in-mold applying coating on the ophthalmic lens by taking advantage of a horizontally-oriented parting line in which the mold opens and closes vertically. In general, the method includes injecting molten thermoplastic resin into an edge-gated lens-forming cavity held closed under a primary clamp force. Opening the mold at a time when the lens is rigid enough to retain its shape and depositing an unpressurized full metered charge of coating onto the center of the lens. Then we co-mold the coating by ramping up the clamp force from zero to a secondary clamp force less than the primary clamp force to compress the coating into a uniformly thick, fringe-free layer. The co-molding step includes reclamping the open mold to the same cavity volume to spread the coating radially-outwardly to a lens periphery within a surficial zone. During said reclamping step, the coating is spread in the absence back pressure. The coating is co-molded to exactly replicate the part-forming surface without deforming the lens.

The depositing step includes applying a liquid coating in an open-air state that thermally cures from the heat of the solidifying lens and the mold and forms an optically transparent coating. The mold utilizes a primary clamp force in the range of 100-150 tons and opens and closes vertically. The secondary clamp force is in the range from about 10% to about 90% of the primary clamp force. The secondary clamp force may be less than, or equal to, the primary clamp force. The full metered charge of coating is between 0.1 ml and 0.8 ml, and more specifically between 0.2 ml and 0.5 ml.

The coating may be applied to polymethyl(meth)acrylate, polycarbonate, polycarbonate/polyester blends, polyamide, polyester, cyclic olefin copolymers, polyurethane, polysulfone and combinations thereof. Excellent results have been achieved with polycarbonate derivatives. The liquid coating includes at least one mono-, di-, multi-, or hexafunctional (meth)acrylate compounds, a catalyst, and a metal salt. The catalyst is selected from alkyl aralkyl peracide compounds. The metal salt may be cobalt naphthenate. The liquid coating has a reacted kick-off temperature near the molding temperature of the substrate lens.

During the co-molding step, the coating is cured for about 2 minutes to 5 minutes. The edge-gated lens-forming cavity is one of an afocal lens forming cavity, a unifocal lens forming cavity, a bifocal straight-top lens forming cavity, a trifocal straight-top lens forming cavity, and a progressive lens forming cavity. The latter stage of co-molding includes ejecting the lens from the mold after the coating has cured and the lens is capable of withstanding ejection forces without deforming. The mold may be reopened to apply additional layers of the same or a different coating. Such coatings may include photochromic coatings, anti-fog coatings, anti-static coatings, anti-scratch coatings, protective coatings, anti-reflective coatings, clear coatings, cosmetically tinted coatings and anti-smudge coatings. The invention further covers thermoplastic ophthalmic lenses manufactured by the described methods.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views:

FIGS. 1A and 1B are graphs showing clamping force as a function of time for two different prior art coating systems.

FIG. 4 is a graph similar to FIG. 1C with the steps from FIG. 3 added thereto.

DETAILED DESCRIPTION OF THE PREFERRED EMBODIMENT

Figure 1C:
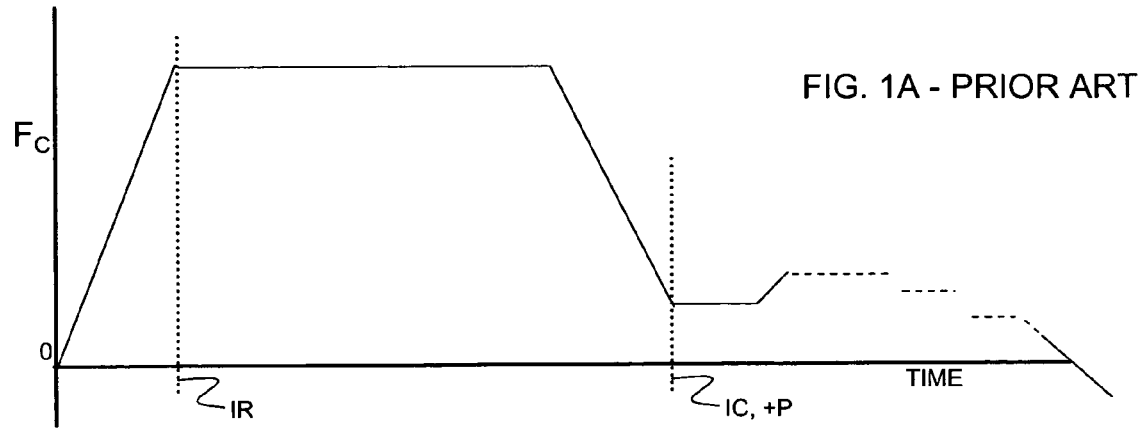
FIG. 1C is a comparative graph illustrating an embodiment of the coating system according to the invention.
Figure 1C:
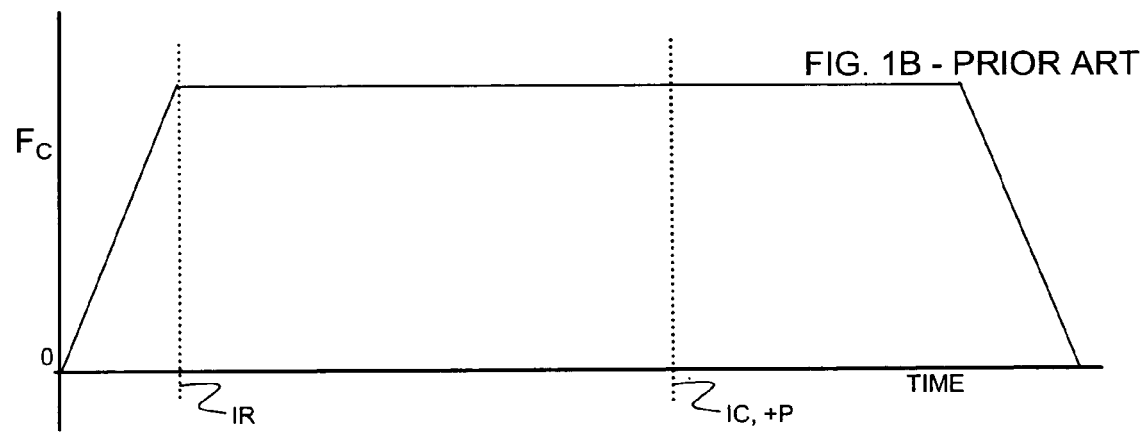
Figure 1C:
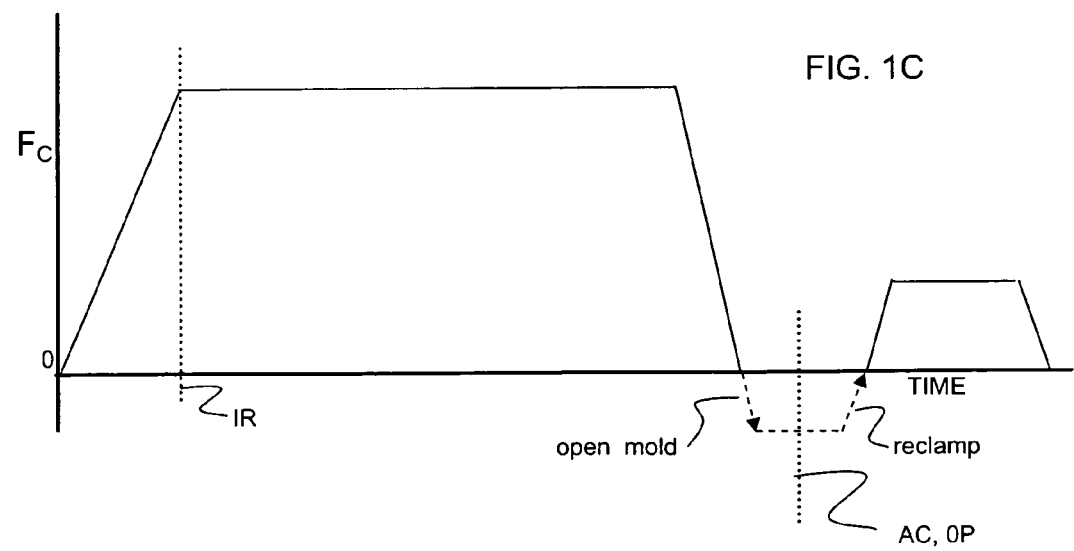

Thermoplastic lenses must be extremely clean before they can be coated. In the regular lens coating process, after the lenses are taken out of mold and degated, they have to be transferred and go through several different cleaning tanks before being coated. The coatings often require heat or UV light in order to cure. The transfer, cleaning, coating and curing operations utilize vast amounts of space and have high power demands to operate conveyors, pumps, heaters and curing ovens. That adds to the cost of the finished product. Accordingly, it would be desirable to coat a lens soon after it is formed by injection molding. In contrast to the prior art, a lens can be coated within 10-20 seconds of initial environmental contact before ejection or degating, thereby eliminating those operations as contamination sources.

The prior art coating methods disclosed in WO 03/031138 and U.S. Pat. No. 6,180,043 employ additional coating injection systems to pump coating into the mold cavity after the substrates are formed. To adapt the mold used in the regular injection molding processes to the processes in above two references, besides the additional coating containment designs or shear edge structure to reduce or eliminate coating leakage, molds have to be modified in order to accommodate the coating injector. For single cavity injection of large automotive parts, it is possible to mount a single injector on top of the injection molding machine. It would be very difficult and costly to handle relatively small multi-cavity lens molds by using above methods. In a six cavity mold, the lowest cavity has the runner exiting from the top, effectively interfering with the placement of a coating injector directly above the mold. Also, variations of the clamp pressure after injection of the coating, as disclosed in U.S. Pat. No. 6,180,043 significantly increase the process complexity. Accordingly, it is surprising that the method according to the invention calls for coating the lenses in a much simpler and more cost efficient way than either of the references mentioned here.

An embodiment of the lens coating process according to the invention will be characterized by the following steps. In the cooling stage of the lens molding, the mold will open for coating deposition. The mold can open as soon as the lens substrate is rigid enough to sustain mold opening. That is, the lens shape which determines the degree of aberration and power, will resist deformation under mold depressurization and vacuum forces. The coating is deposited as an unpressurized coating solution onto the lens substrate. The mold is reclamped to contact the coating with the upper mold insert and spread an even layer over the lens surface. The coating spread pressure is directed in exactly the same direction and manner as the lens forming clamp pressure. Once closed the coating is heated from below with lens substrate, and from above with mold insert. A 2-4 minute coating cure phase is provided while the lens achieves sufficient solidification to be ejected from injection molding machine.

Referring now in detail to the figures and in particular, FIG. 1A, there is shown a schematic graph of a prior art method of clamping force $F_C$ versus time, from U.S. Pat. No. 6,180,043. After the initial ramp up, the resin is injected at point IR. Once the automotive part has achieved solidification capable of withstanding a coating pressure and coating flow pressure the clamp force $F_C$ is ramped down to about 5-10 tons or less, as stated in the examples. The coating is driven by the injection pressure, that is positive pressure +P, at point IC, to spread out over the surface of the part. The clamping force is then increased before undergoing a multistage, variable clamp force reduction. This clamp force profile helps minimize deformation on structural ribs of the automobile parts being coated with pigmented coatings.

Referring now to FIG. 1B a further example of a prior art method showing a constant clamping force that is employed throughout almost the whole in-mold coating process. This graph represents the process from WO 03/031138, as can best be understood. Again, the coating is driven by the injection pressure, that is positive pressure +P, at point IC, to spread out over the surface of the part.

The comparative graph of FIG. 1C illustrates the coating application at point AC, at zero pressure, 0P, according to the invention The method does not balance an injection pressure with clamp force. On the clam force $F_c$ axis, we show an opening of the mold, represented in dotted line below the zero $F_c$ axis. This is not representing a negative clamp force, but rather schematically illustrating where on the time axis the mold opening (at zero clamp force) occurs. A much lower clamping force, compared to that applied during lens molding, is applied to reclamp the mold after the coating injection. By using the insert to spread the coating under clamping force, there is almost no possibility that the coating spreading process will deform the shape or surface of the lens and a uniform coating thickness can be achieved.

In general, the methods according to the invention will utilize a standard injection molding machine that has a horizontal parting line with the movable clamp plate on top. The machine can be hydraulic, electric or hybrid machine. A coating dispenser is provided adjacent to the mold and is adapted to pivot or extend into the open mold.

Figure 2:
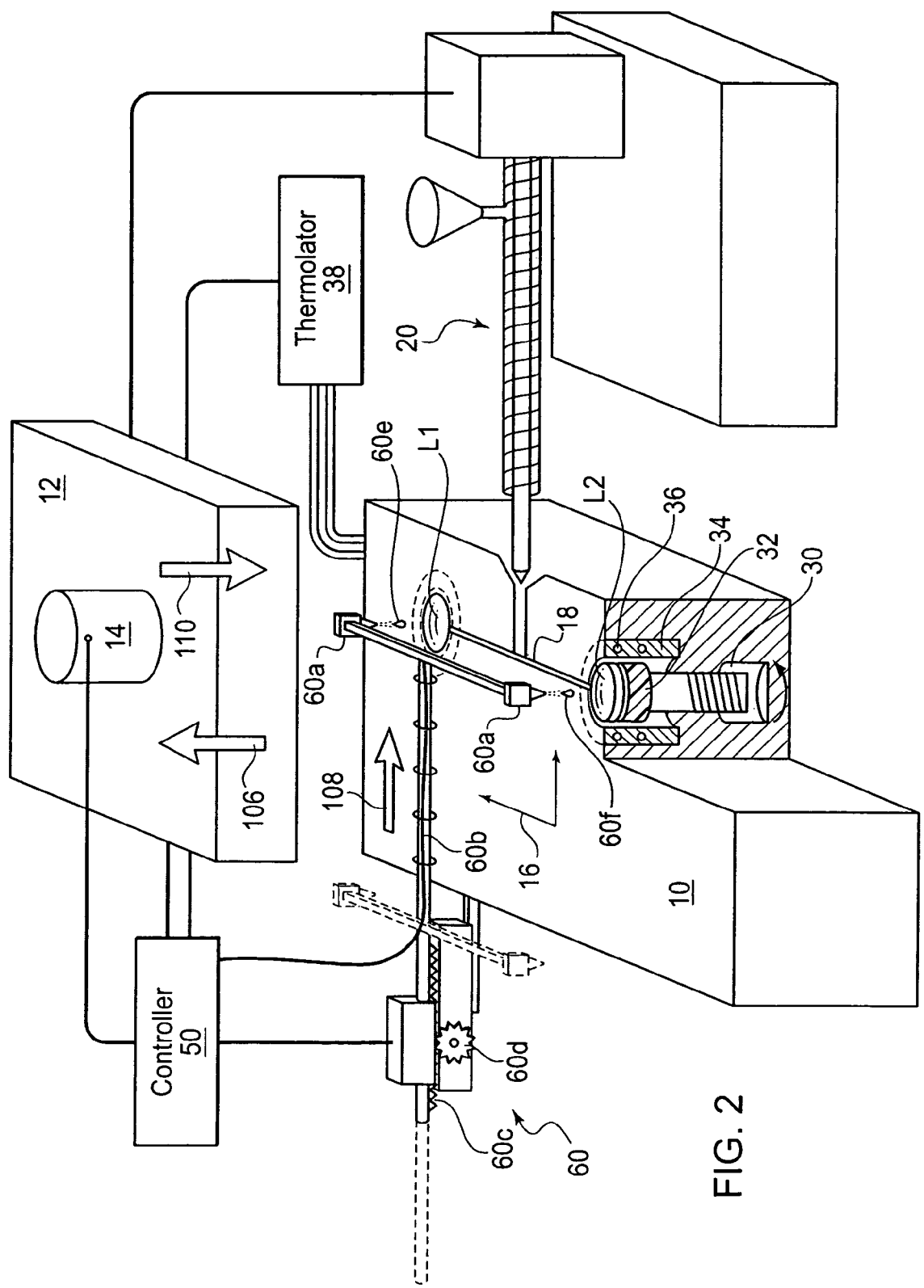
FIG. 2 is a schematic, perspective view of the coating system equipment according to an embodiment the invention.

As can be seen in FIG. 2, we orient the fixed or stationary mold half 10 on the bottom, with the movable mold half 12 on top, and capable of vertical clamping motion via an electric or hydraulic clamping unit 14. Clamping unit 14 can provide 100 tons or more clamping force as is typical in optical lens molding. Between the mold halves lies a horizontally oriented parting line 16. The mold halves are equipped with a runner system 18. A resin screw injector 20 is aligned with the input of runner system 18. Portions of runner system 18 may be located in the facing surface of movable mold half 12.

A screw-jack 30, or similar height adjusting device supports a lens-forming insert 32 within a receiver 34. Circulating channels 36 may be located within the receiver, or nearby in the mold block, which have a temperature control fluid circulated therethrough by a thermolator 38. Screw injector is also heated to melt the resin. In the case of polycarbonate, the screw injector may have a heating range of 500 to 600 degrees F. Thermolator 38 may heat receiver 34 to a range of 200 to 300 degrees F. Similar temperature control lines may be located within movable mold half 12.

A process controller 50 is coupled to clamping unit 14, resin injector 20, thermolator 38 and other components to coordinate the molding of lenses as is known in the art. According to an embodiment of the invention we further provide a coating applicator 60 which is coupled to controller 50. More specifically, coating applicator 60 is mounted adjacent the mold halves for pivoting, sliding or other reciprocating motion to position applicator heads 60*a* over the lens cavities or lenses. For example, applicator 60 is bracketed to the side of lower, stationary mold half 10. An arm 60*b*, shown as a T-shaped arm, is equipped with a rack 60*c* that is driven by a pinion 60*d*. Upon actuation by controller 50, pinion 60*d* drives arm 60*b* in a direction parallel to plane 16, into the open mold to position heads 60*a* over the just injected lens mass. A full metered charge or drop of coating 60*e,f* is deposited onto each lens L1, L2 to be coated. Arm 60*b* may pivot, swing or follow another path to bring it into the position shown in the drawing. One head may be employed to sequentially apply coating onto each lens. For 4-, 6- or 8-cavity molds (or more) additional heads or sequential applications may be employed. It is axiomatic, that more heads will reduce cycle time by simultaneously applying a coating and retracting to close the mold sooner. The retracted position is shown in dotted line to the left of arm 60*b*.

According to the invention, the lens molding process will include the following steps. After injection (and any packing phase) the mold will open. The coating is deposited as an unpressurized coating solution onto the center of the round lens. The mold is reclamped to contact the coating with the upper mold insert and spread it into an even layer over the lens surface. The coating spread pressure is applied in exactly the same direction and manner as the lens forming clamp force. The coating is heated from below by the lens, and from above by the upper mold insert. A 2 minute minimum coating cure phase occurs while the lens achieves sufficient solidification to be ejected from injection molding machine.

Figure 3:
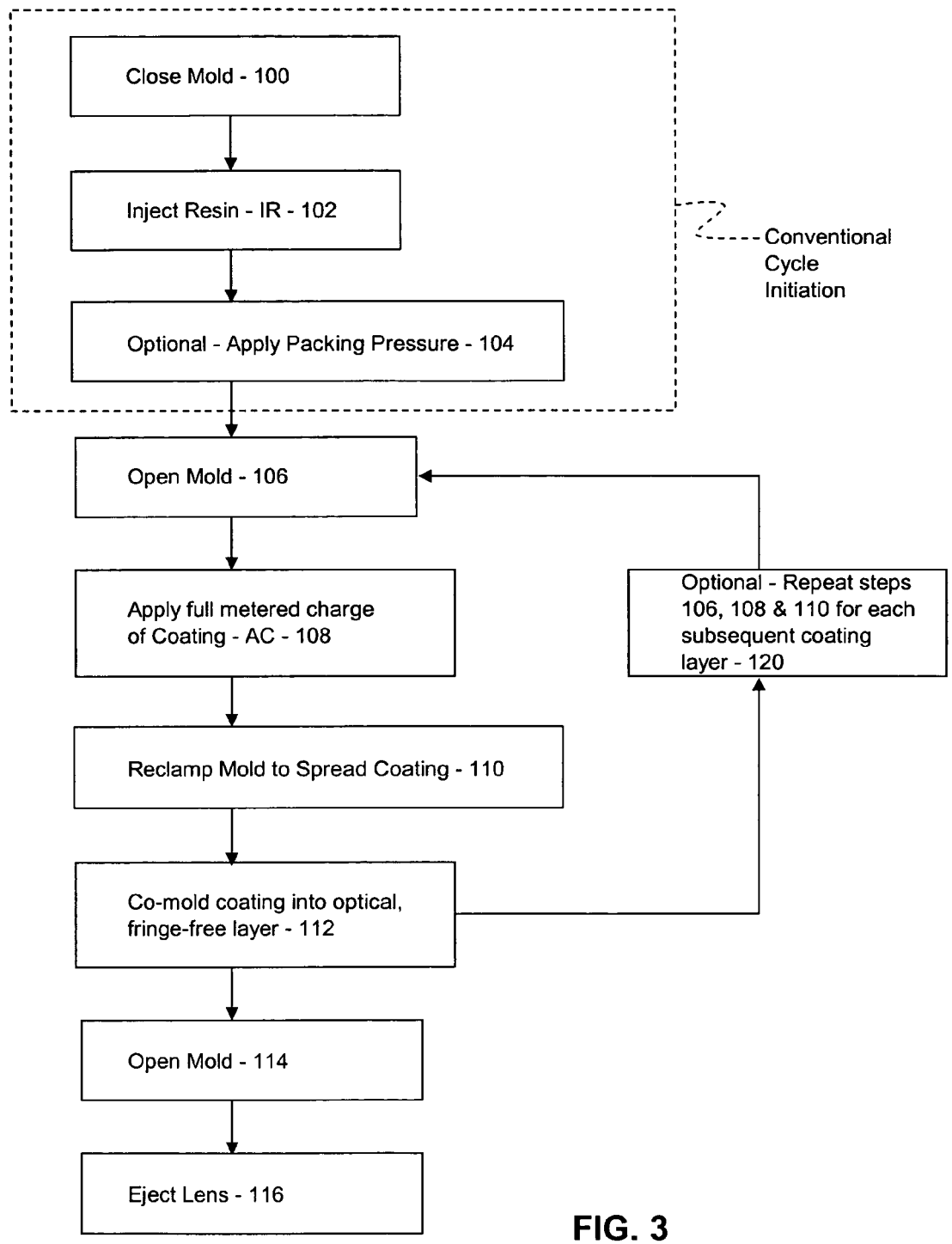
FIG. 3 is a flowchart showing various steps according to an embodiment of the coating method according to the invention.

As can be seen in reference to FIGS. 2 and 3 and 4, a conventional cycle initiation is commenced with the closing of the mold, in step 100, injecting resin (IR) 102 and optionally applying packing pressure 104. During this injection stage, a primary clamp force, of about 100 tons or more is utilized. Once the lens is rigid enough to sustain mold opening, the mold is opened, in step 106. Mold opening constitutes upward vertical retraction of the movable side of the mold. Arm 60*b* is advanced, and the coating is applied 108. For example, for lenses of all powers and configurations, the coating may be applied onto, or near, the center of the lens. The lenses will all generally have a circular outer perimeter. After arm 60*b* is retracted, movable mold half 12 closes to spread the coating across the entire upper lens surface 110. The coating is spread radially outwardly from the center, or near the center, of the lens, out to the circular periphery. During the co-molding stage 112, a secondary clamp force, less than the primary clamp force is utilized. Once the secondary clamp force is achieved, it may remain constant until the ejection stage is initiated. After the coating is cured, and the lens has solidified sufficiently, the mold is opened 114, and the coated and cured lens is ejected 116.

For the multi-pair cavity molds, the invention covers two or more pair of lens cavities fed by a corresponding number of runners. The runners extend radially outwardly from a central source that is coupled to the resin screw. The radially-extending runners lie in a horizontal plane. A lens forming cavity is disposed at the outer terminal end of each runner. In one embodiment, the coating applicator has four heads that are positioned -in the same spaced relationship as the lens forming cavities. The applicator arm extends into the open mold to a location where each head resides directly over a lens that is located within each part-forming cavity. Coating is simultaneously drop fed, at zero pressure, onto the center of each lens. The heads may be retained by an applicator arm having a double T shape, square/rectangular shape, diamond shape or X shape. For molding 3 pairs, 4 pairs or more lenses, the applicator arm may have circular shape or a spider shape with a central hub and 6, 8 or more legs extending radially out from the central hub. One reservoir of coating solution may be provided to multiple applicators. Each applicator may have its own reservoir of coating solution. In an advanced coating system, it may be desirable to apply two different coatings, by repeating steps 106-112 after the first coating has cured sufficiently to receive a second coating. There may be provided two, or more, central reservoirs of coating, feeding one or two applicator heads per lens. Each lens may alternately have two corresponding reservoirs which feed one or two separate applicator heads.

More particularly, the methods to manufacture in-mold coated thermoplastic lens comprises the steps of:
  a. conduct the regular injection molding cycle to mold thermoplastic lens first
  b. at end of the lens molding cycle, open the mold while without ejecting the lens, so the lens sits still in the cavity in the way that convex surface facing upward. Depends on which surface of the lens is to be coated, the lens can also be molded in the way with concave surface facing upward.
  c. deposit coating liquid in the center of the lens convex (or concave) surface.
  d. reclamp the mold right after the coating deposition by moving the upper mold half downward. Coating was compressed by the clamping tonnage and spread out to cover the whole convex (or concave) lens surface. Coating is thermally cured by the heat from the mold plates and the residual heat in the lens substrate. Coating thickness depends on the shrinkage and compressibility of the lens substrate.
  e. after 2 to 5minutes, reopen the mold and eject the coated lens The substrate that could be used in this method could be any injection moldable lens material like PMMA, polycarbonate, polycarbonate/polyester blend, polyamide, polyurethane, polysulfone, cyclic olefin co-polymers, etc. In a preferred embodiment the substrate is polycarbonate.

The injection cycle is as usual and depends from the nature of the thermoplastic. Usually the mold temperature is comprised from 240° F. to 290° F., the melt temperature is comprised from 540° F. to 600° F., the packing pressure is comprised from 5000 psi to 15000 psi, the packing time is comprised from 10 sec to 50 sec, and the cooling time is comprised from 60 sec to 265 sec.

EXAMPLE 1

First, a 6 base 10 mm thick PC lens was injection molded on an injection molding machine of which the mold is of horizontally oriented parting line. The top mold insert is a concave insert which will form the lens front surface and the bottom mold insert is a convex insert will form the lens back surface. The main molding parameters consisted of mold temperature set at 270° F., melt temperature ranging from 550° F. to 560° F., packing pressure set at 10950 psi for 45 seconds and cooling down for 255 seconds.

At the end of the molding cycle, the mold opened for coating deposition. Without removing the lens from the cavity a thermal curable coating, 0.25 ml was deposited in the center of the injected lens, using an auto-dispenser. The mold was re-clamped and held for 3 minutes at 270° F.

Finally, the mold was opened and the optically clear, fringe-free coated lens was ejected from the mold insert.

Following is the coating composition that was used in the example.

| COMPONENT | CONCENTRATION (%) |
|---|---|
| Ebecryl 5129 | 50.0 |
| Ebecryl 284N | 26.0 |
| Hydroxy propylmethacrylate | 15.28 |
| Isobornyl Acrylate | 7.6 |
| t-butyl perbenzoate | 1.0 |
| Cobalt Naphtenate | 0.1 |
| Surfactant EFK 3034 | 0.02 |

A coating according to the present invention advantageously provides and/or includes at least the following characteristics:

the coating is solvent free; in fact no volatile organic compounds (VOCs) should be generated during the in-mold coating process, which could perturb the polymerization parameters and thus the optical property of the lens;

the coating is cured at a thermoplastic substrate high molding temperature while maintaining its optical clarity without etching the thermoplastic substrate;

the coating can flow across the front surface of the lens before it gels and fast cures thereafter; the kinetic parameters are important to improve flow characteristics;

the coating, advantageously, will impart desirable functional properties onto an ophthalmic lens such as, tintability, scratch resistance, etc.

A coating according to the present invention is thermally curable, optically clear, does not show visible interference fringes after coating onto a lens and comprises an optically transparent coating that is compatible with the lens material in order to adhere to it without causing any undesirable effects while imparting the desired features (tint, scratch resistance, etc.) onto the lens material.

A coating composition according to the present invention is preferably solvent less and includes an acrylate compound. The acrylate compound is preferably thermally cured, which means the coating may be cured via, e.g., azo, peroxides, and/or blocked tertiary amine. Chemically speaking, the coating composition preferably includes multi-functional acrylates comprising up to hexa functional groups and with various molecular weights. Preferably, the present invention comprises a multi-functional urethane acrylic coating that is modified to meet various competing requirements. For example, such coating needs to stay in liquid form to flow along a hot mold insert to an even thickness and then polymerize rather quickly, since the lens molding process is being extended by the coating set time. Indeed, a coating used in the present invention advantageously remains in liquid form to flow along a heated mold insert to a uniform thickness and then polymerizes quickly.

More particularly, a coating composition according to the present invention preferably comprises acrylates including monofunctional acrylates and/or monofunctional methacrylates such as isobornyl acrylate and hydroxylpropyl methacrylate, as well as tetrafunctional acrylates and/or tetrafunctional methacrylates and hexafunctional acrylates and/or hexafunctional methacrylates. Exemplary acrylates that may be used in the present invention may include and are not limited to reactive multifunctional acrylates, preferably hexafunctional aliphatic urethane acrylates. For example, exemplary acrylates used in the present invention may include hexafunctional acrylates and at least one difunctional acrylate. As noted herein, the term "(meth) acrylate" refers to either the corresponding acrylate or methacrylate.

Acrylates may be obtained from UCB Chemicals or from Sartomer and Henkel (a German Co.), and may in one embodiment comprise, e.g., Ebecryl™ brand acrylates. A brief general description of various Ebecryl acrylates in EB number formats which may be used according to the present invention is as follows:

1) 284: aliphatic urethane diacrylate diluted 12% with HDOHA. Excellent light fastness, exterior durability, toughness and good flexibility.

2) 1290: hexafunctional aliphatic urethane acrylate containing an acrylated polyol diluent. Provides fast cure with excellent hardness, solvent and abrasion resistance.

3) 5129: hexafunctional aliphatic urethane acrylate combining good scratch resistance with improved flexibility 4) 8301: hexafunctional aliphatic urethane acrylate containing an acrylated polyol diluent.

Use of hydroxylpropyl methacrylate presents a particular interest to slow down the reaction in the coating composition. Multi-functional acrylates of three functional groups or higher advantageously will provide more cross linking and result in higher abrasion resistance. For example, hexa-functional acrylates will provide a high degree of cross linking due to having six (6) functional groups. The urethane backbone of these high functional acrylates provides flexibility and greater ability to resist heat. Difunctional acrylate species are used to increase the flexibility and toughness and to control the viscosity of the formulation for process-ability to a certain extent.

A monofunctional methacrylate, such as hydroxylpropyl methacrylate, serves as a monofunctional diluent and kinetic modifier. It is used to terminate the reaction or to slow down the propagation of polymerization so that it will have some stability and a window of reactivity for processing. Monofunctional methacrylates used in a composition according to the present invention serve as reactive diluents and kinetic modifiers to improve flow characteristics.

With regards to the term acrylates, it is to be noted that methacrylates and other unsaturated compounds, whether mono- or multifunctional may also be used in addition to, or instead of, acrylates. In some cases methacrylates may experience a slower chemical reaction during polymerization. Acrylate or methacrylate compounds may be selected from the family of aliphatic urethane acrylates which include, e.g., from two to about six functional groups.

In a preferred embodiment of the present invention, high molecular weight acrylates (for example, acrylates having a molecular weight of at least 1000 centipoises (cps) or higher at 25° C.) are preferably used for ophthalmic injection molding according to the present invention. This embodiment presents the advantage of improved control of the viscosity and flow of the coating composition on a heated surface. For example, a high injection pressure requires a high viscosity flow to allow for the higher temperature (i.e., higher than room temperature) during applied extrusion. It is to be noted that the viscosity may further be adjusted as necessary based on the particular injection molding parameters and requirements.

In one embodiment of the present invention, the coating composition preferably comprises an acrylic base cured with an initiator (e.g., t-butyl perbenzoate). In fact, the thermal cure process of the present invention utilizes free radical polymerization. The initiator (t-butyl perbenzoate) obtains energy by absorbing heat to decompose and generate free radicals (that is, the free radical reaction is generated by thermal heating). These free radicals then attach monomers or oligomers (reactive multifunctional acrylates) to generate more free radicals to propagate the reaction to form long molecular chains and eventually a cross-linked network.

An in-mold coating composition according to the present invention preferably may further include at least one catalyst (initiator) and at least one metal salt. The catalyst may be selected from, e.g., alkyl aralkyl peracide, azo derivatives and blocked tertiary amine, is preferably selected from ketone peroxides, diacyl peroxides, dialkylperoxides, diperoxyketals and peroxyesters, and in a very preferred embodiment comprises tert-butylperbenzoate.

The examples disclosed herein preferably use peroxides derived from alkyl aralkyl peracide with a metal salt promoter. Peroxides are used to cure the coating via a free radical reaction. Metal salt promoters help to generate free radicals quickly and minimize oxygen inhibition. The metal salt and peroxide concentration are preferably chosen to fit a curing cycle for the current process. The concentration ratio can be varied as necessary to fit a particular process requirement. Again, although use of peroxides for curing is a preferred method, and more specifically tert-butyl perbenzoate is a preferred candidate, alternative methods for curing may include use of azo and blocked tertiary amine.

The metal salt is preferentially selected from cobalt naphthenate, cobalt octoate, cobalt neodecanoate, copper naphthenate, zinc naphthenate, and potassium octoate, and preferably, the metal salt comprises cobalt naphthenate.

In one embodiment, an exemplary coating composition according to the present invention comprises the following: (a) at least one hexafunctional acrylate and/or hexafunctional methacrylate compound; (b) at least one difunctional acrylate and/or a difunctional methacrylate compound; (c) Hydroxyl propylmethacrylate; (d) Isobornyl acrylate; (e) T-butyl perbenzoate; and (f) Cobalt naphthenate.

An in-mold coating composition according the invention may optionally further include a surfactant which is preferably selected from a fluorinated surfactant or a silicone surfactant. That is, a surfactant such as a fluorinated surfactant (e.g., EFKA 3034) or a silicone surfactant (e.g., Silwet L-7602) may be included in a coating composition according to the present invention. The surfactant in the coating composition may be added to improve wetability of the mold surface.

The coating composition may also optionally include acrylic or epoxy functionalized colloids, for example, OG-101 or OG-103 (available from Clariant), or functionalized colloidal silica with acrylic silanes, or other colloids such as, e.g., cerium colloid, niobium colloid, and antimony colloid.

An in-mold coating composition according to the present invention may further optionally include, e.g., a metal alkoxide which may be selected, for example, from zirconium isopropoxydes, methyl trimethoxysilane and tetraethoxysilane.

A coating composition according to the present invention may further optionally include at least one dichroic dye, a photochromic dye and/or one liquid crystal.

It is to be understood by one of ordinary skill in the art that the coating should preferably retain its qualities at the lens substrate molding temperature, e.g., for a polycarbonate substrate, such temperature is around 250° F.

Upon coating of an optical lens, a coating according to the present invention is optically clear and may have a thickness ranging from about 1 micron to about 100 microns. For example, typical abrasion resistance coating thickness ranges from about 1 micron to about 8 microns, and a photochromic system can be up to about 20 microns or more.

Advantageously, an in-mold coating composition according to the present invention provides very good anti-abrasion properties. To further increase abrasion resistance, it is also possible to include in the coating formulation according to the present invention acrylic or epoxy functionalized colloids, as discussed above. Metal alkoxides and its derivatives may also optionally be added as discussed above to increase refractive index, abrasion resistance and perhaps influence the rate of polymerization.

According to one embodiment, a coating composition according to the present invention comprises the following:

| | | |
|---|---|---|
| Hexafunctional aliphatic urethane acrylate | range: about 33% to 52% | preferred: 50% |
| Aliphatic urethane diacrylate diluted 12% with HDOHA | range: about 13% to 31% | preferred: 25.6% |
| Isobornyl acrylate | range: about 6% to 9% | preferred: 7.6% |
| Hydroxylpropyl methacrylate | range: about 12% to 18% | preferred: 15.4% |
| Tetrabutylperoxybenzoate | range: about 0.5% to 2% | preferred: 1% |
| Metal complex (e.g., cobalt naphthenate) | range: about 0.25 to 1% | preferred: 0.4% |

EXAMPLE 2

The insert in the top mold half is a concave insert that is of straight-top structure, in order to make bi-focal lens. All the molding procedures and coating formulations in use were the same as in Example 1.

When the mold firstly opened, prior to coating deposition, it was observed that straight-top structure was very well replicated in the lens front surface. After the coating curing and mold reopen, the optically clear, fringe-free coated bi-focal lens was ejected from the mold. The straight-top structure was also very well retained in both the coating layer and the lens substrate.

Optical grade coatings are difficult to achieve with straight-top structures, including bi-focal and tri-focal lenses. The surface discontinuity in the vicinity of the straight-top interferes with coating on to, and flow off-of, the lens surface, that negatively impacts conventional spin-coating and dip-coating techniques. The invention utilizes the part-forming surface to compress the coating/lens ensemble in a manner which "molds" the exterior surface of the coating, to form a coating layer of uniform thickness.

This example demonstrates an important feature of the invention, which is referred to as "co-molding." We define co-molding as a process in which the mold in reclamped onto the coating drop with the clamp force then ramping up from zero to a secondary clamp force. The secondary clamp force may remain constant once it has reached its maximum value. The maximum value may be less than, or equal to, the primary clamp force employed to mold the lens. In other words, the secondary clamp force is not greater than the primary clamp force. Under the secondary clamp force the coating is conjointly molded and compressed with the lens. While co-molding is present in every embodiment of the invention, its benefits are most easily recognized in connection with discontinuous lens surfaces, like the straight-top bifocal described in this example 2. Co-molding helps replicate the shape of the lens surface in the coating. Co-molding uses the same fixed cavity volume at all times and contains the coating with a surficial zone that results from resin shrinkage. This contributes to uniform coating thickness, which is an important factor in producing optically clear coatings. One embodiment of the co-molding process is to maintain a constant secondary clamp force.

The inventive method coated straight top lenses just as successfully as smooth lenses. In comparative testing a straight top lens of 10 mm thickness and a smooth lens of 10 mm thickness were both coated with a secondary clamp force near the primary clamp force. The coating thickness on the straight top was 20 µm+/−4 µm and for the smooth lens 16 µm+/−4 µm. Although the thickness varied from lens to lens, each lens had a coating with uniform thickness across its entire surface. Variations should be narrowed upon implementation of molds specifically designed to contain liquid coating solutions.

EXAMPLE 3

A 6 base 10 mm polycarbonate lens was injection molded first using the same machine and same molding parameters as in example 1. Mold was then opened and a liquid coating drop, 0.25 ml with blue dye in it, was deposited in the center of the lens front surface. The mold was then reclamped to thermally cure the coating for 2 minutes. This corresponds to steps 100-112 on the flowchart of FIG. 3. The mold was then reopened and another 0.25 ml coating drop without blue dye in it was deposited in the center of the already coated lens front surface. The mold was then reclamped for another 5 minutes to cure the coatings. This second coating application follows the path of step 120, wherein steps 106, 108 and 110 are repeated. Finally, the mold was opened and the optically clear, fringe-free bi-layer coated lens was ejected from the mold.

In this example, the first full metered charge is 0.25 ml. The second full metered charge is 0.25 ml. In other words, all the coating for a given layer, is deposited at one time, in a drop onto the center of the lens.

Alternatively, it is possible to apply different coatings, each with a different optical function to produce an in-mold multifunctional coated lens. The multiple coating layers may be independently selected from photochromic coatings, anti-fog coatings, anti-static coatings, anti-scratch coatings, protective coatings, anti-reflective coatings, clear coatings, cosmetically tinted coatings and anti-smudge coatings.

An important aspect of the open mold coating application according to the invention, is that in the initial phase of reclamping 110, the coating is able to spread out at low, or no back pressure. For example, as the coating begins to spread upon contact with the upper lens insert, the parting line may still be open resulting in no back pressure. As the mold closes further, the coating may continue to spread under very low back pressure. Thus the coating covers the entire lens surface under relaxed conditions, contributing to the fringe-free coated lens, even upon application of two coating layers. This spreading condition, in combination with the co-molding process, leads to a uniformly thin coating layer, with very high optical quality, and reduces or eliminates fringes on a variety of lens surface contours. Fringes are wavelike contours in the coating layer which can cause distortion due to the varying thickness from peak to trough.

In a comparative test, 2 mm thick lenses were coated with a secondary clamp force that was about 40% of the primary clamp force. At 2 mm thick, the low volume of polycarbonate does not shrink much, leaving only a paper thin surficial gap in the fixed volume cavity used during primary and co-mold clamping. Coating thickness was 3.9 µm+/−0.3 µm. at double the clamp force, the coating was uniformly 1.2 µm+/−0 µm thick. At the same clamp force, a 10 mm lens had a coating thickness of 16 µm+/−4 µm.

Having described preferred embodiments for lens manufacturing, materials used therein for coatings and methods for processing same (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for optically coating an injection molded thermoplastic lens that resides in an injection molding machine oriented to a horizontal parting line, comprising the steps of:
    injecting molten thermoplastic resin into an edge-gated lens-forming cavity of an injection molding machine held closed under a primary clamp force;
    opening the mold at a time when the lens is rigid enough to retain its shape;
    depositing an unpressurized full metered charge of liquid coating onto the center of the lens; and
    co-molding the coating by ramping up the clamp force from zero to a secondary clamp force not greater than the primary clamp force to compress the liquid coating into a uniformly thick, fringe-free layer within the same lens-forming cavity volume, wherein the liquid coating thermally cures from the heat of the solidifying lens and the injection mold to form an optically transparent coating.

2. The method of to claim 1, wherein the co-molding step includes reclamping the open mold to spread the coating radially-outwardly to a lens periphery within a surficial zone.

3. The method of to claim 2, wherein during said reclamping step, the coating is spread in the absence back pressure.

4. The method of to claim 1, wherein the co-molding step includes co-molding the coating to exactly replicate the part-forming surface without deforming the lens.

5. The method of claim 1, wherein said depositing step comprises applying a liquid coating in an open-air state.

6. The method according to claim 5, wherein the liquid coating includes one or more (meth)acrylate compounds, a catalyst, and a metal salt.

7. The method according to claim 6, wherein the liquid coating includes at least one hexafunctional acrylate compound, at least one difunctional acrylate compound, and at least one monofunctional acrylate compound.

8. The method according to claim 6, wherein the catalyst is selected from alkyl aralkyl peracide compounds.

9. The method according to claim 6, wherein the metal salt is Cobalt naphthenate.

10. The method according to claim 5, wherein the liquid coating has a reacted kick-off temperature near the molding temperature of the substrate lens.

11. The method of claim 1, wherein the mold opens and closes vertically.

12. The method of claim 1, wherein the primary clamp force is over 100 tons.

13. The method of claim 12, wherein the secondary clamp force is in the range from about 10% to about 90% of the primary clamp force.

14. The method of claim 1, wherein the primary clamp force is about 150 tons.

15. The method according to claim 1, wherein the full metered charge of coating is between 0.1 ml and 0.8 ml.

16. The method according to claim 1, wherein the full metered charge of coating is between 0.2 ml and 0.5 ml.

17. The method according to claim 1, wherein the thermoplastic resin is selected from the group consisting of polymethyl(meth)acrylate, polycarbonate, polycarbonate/polyester blends, polyamide, polyester, cyclic olefin copolymers, polyurethane, polysulfone and combinations thereof.

18. The method according to claim 17, wherein thermoplastic is a polycarbonate derivative.

19. The method according to claim 1, wherein said co-molding step includes curing the coating for about 2 minutes to 5 minutes.

20. The method of claim 1, wherein the edge-gated lens-forming cavity is one of an afocal lens forming cavity, a unifocal lens forming cavity, a bifocal straight-top lens forming cavity, a trifocal straight-top lens forming cavity, and a progressive lens forming cavity.

21. The method of claim 1, wherein following said co-molding step, the method further including the step of:
ejecting the lens from the mold after the coating has cured and the lens is capable of withstanding ejection forces without deforming.

22. The method of claim 1, wherein following said co-molding step, the method additionally including the step of:
further opening the mold at a time when the lens is rigid enough to retain its shape;
further depositing an unpressurized full metered charge of further coating onto the center of the lens; and
further co-molding the coating by ramping up the clamp force from zero to a secondary clamp force to compress the further coating into a further uniformly thick, fringe-free layer.

23. The method of claim 22, wherein the further deposited coating is the same as said deposited coating.

24. The method of claim 22, wherein the deposited coating is selected from the group consisting of photochromic coatings, anti-fog coatings, anti-static coatings, anti-scratch coatings, protective coatings, anti-reflective coatings, clear coatings, cosmetically tinted coatings and anti-smudge coatings.

25. The method of claim 22, wherein the further deposited coating is different from said deposited coating.

26. The method of claim 25, wherein the further deposited coating has a different optical function from said deposited coating to produce an in-mold multifunctional coated lens.

27. The method of claim 26, wherein the deposited coating and the further deposited coating are independently selected from the group consisting of photochromic coatings, anti-fog coatings, anti-static coatings, anti-scratch coatings, protective coatings, anti-reflective coatings, clear coatings, cosmetically tinted coatings and anti-smudge coatings.

28. The method of claim 22, wherein said steps of further opening, further depositing and further co-molding are repeated for the application of a third or higher layer of coatings.

29. A thermoplastic ophthalmic lens manufactured by the process of claim 1.

* * * * *

UNITED STATES PATENT AND TRADEMARK OFFICE
CERTIFICATE OF CORRECTION

| | | |
|---|---|---|
| PATENT NO. | : 7,833,442 B2 | Page 1 of 1 |
| APPLICATION NO. | : 11/313590 | |
| DATED | : November 16, 2010 | |
| INVENTOR(S) | : Chen et al. | |

It is certified that error appears in the above-identified patent and that said Letters Patent is hereby corrected as shown below:

Column 12, line 46 (Claim 2, line 1) before "claim 1" delete "to";

Column 12, line 49 (Claim 3, line 1) before "claim 2" delete "to"; and

Column 12, line 51 (Claim 4, line 1) before "claim 1" delete "to".

Signed and Sealed this
Third Day of May, 2011

David J. Kappos
*Director of the United States Patent and Trademark Office*